United States Patent
Ferri et al.

(10) Patent No.: US 10,534,320 B2
(45) Date of Patent: Jan. 14, 2020

(54) OPTICAL POSITION DETECTION OF A TIMEPIECE CROWN STEM

(71) Applicant: The Swatch Group Research and Development Ltd, Marin (CH)

(72) Inventors: Yvan Ferri, Lausanne (CH); Raphael Balmer, Courrendlin (CH); Damien Schmutz, La Neuveville (CH); Pascal Lagorgette, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 562 days.

(21) Appl. No.: 14/923,700

(22) Filed: Oct. 27, 2015

(65) Prior Publication Data
US 2016/0116306 A1 Apr. 28, 2016

(30) Foreign Application Priority Data
Oct. 28, 2014 (EP) .................................. 14190708

(51) Int. Cl.
*G04B 27/00* (2006.01)
*G04C 3/00* (2006.01)
*G01D 5/347* (2006.01)

(52) U.S. Cl.
CPC .......... *G04B 27/002* (2013.01); *G04C 3/001* (2013.01); *G01D 5/347* (2013.01)

(58) Field of Classification Search
CPC ....... G04B 27/002; G04C 3/001; G01D 5/347
See application file for complete search history.

(56) References Cited

U.S. PATENT DOCUMENTS

| 4,031,341 A | * | 6/1977 | Wuthrich | G04C 3/005 200/345 |
| 4,459,031 A | | 7/1984 | Perucchi | |
| 4,511,259 A | * | 4/1985 | Horiuchi | G04G 21/00 368/10 |
| 6,017,127 A | * | 1/2000 | Kurple | G01D 11/28 362/23.01 |

(Continued)

FOREIGN PATENT DOCUMENTS

| EP | 2 884 239 A1 | 6/2015 |
| WO | WO 01/22038 A1 | 3/2001 |
| WO | WO 2014/200766 A1 | 12/2014 |

OTHER PUBLICATIONS

European Search Report dated Jul. 2, 2015 in European Application 14190708, filed on Oct. 28, 2014.

*Primary Examiner* — Georgia Y Epps
*Assistant Examiner* — Don Williams
(74) *Attorney, Agent, or Firm* — Oblon, McClelland, Maier & Neustadt, L.L.P.

(57) ABSTRACT

A method of detecting a movement of a timepiece setting stem arranged to be moved axially along and/or rotated about its longitudinal axis. The method includes a light source illuminating a portion of the setting stem; a light detector receiving a reflected or diffracted light pattern from the setting stem; a processor forming a first pixel pattern representative of the reflected light pattern at a first time instant; the processor forming a second pixel pattern representative of the reflected light pattern at a second, later time instant; and determining that the setting stem has been moved, if the second pixel pattern is different or shifted with respect to the first pixel pattern.

16 Claims, 1 Drawing Sheet

(56) References Cited

U.S. PATENT DOCUMENTS 8,934,321 B2 * 1/2015 Fung ................ G04C 17/00
368/223
2015/0168178 A1 6/2015 Hoover et al.

* cited by examiner

OPTICAL POSITION DETECTION OF A TIMEPIECE CROWN STEM

This application claims priority from European Patent Application No. 14190708.9 filed Oct. 28, 2014, the entire disclosure of which is incorporated herein by reference.

TECHNICAL FIELD

The invention relates to the field of movement or position detection of a timepiece crown stem. More specifically, the present invention relates to a method of optically detecting a movement of a timepiece setting stem. The invention also relates to a corresponding sensor arrangement.

BACKGROUND OF THE INVENTION

Generally, incremental or absolute encoding schemes can be used to measure the angular position of a rotating device, such as a volume-control knob or the crown of an electronic watch. In many applications, such rotating control elements are also axially displaceable in order to trigger or activate various functions of a device. Therefore, it may also be necessary to measure the axial position of the same knob or crown. In watch applications, the axial position of setting stem, which is usually terminated by a crown at its distal end, is used to change the modes of the watch, such as current time display, date setting, and time setting, for example. If the crown is pulled out one discrete axial position to enter the date setting mode, angular rotation of the crown is then used to move from one day to the next. If the crown is pulled out two discrete axial steps, angular rotation of the crown will then be used to set the time.

For determining or measuring axial and/or angular movements and/or positions of a rotational device, a sensor arrangement is generally needed to detect a coding pattern on the rotational device. It is desirable that such a sensor arrangement provide a high resolution angular and/or translational movement or position detection and that the wear in the sensor arrangement be minimised. Furthermore, it would be desirable to obtain a position or relative movement detection arrangement that is simple to assemble and takes up little space.

SUMMARY OF THE INVENTION

It is an object of the present invention to provide a position or relative movement detection arrangement of a timepiece setting stem that fulfils the above criteria.

According to a first aspect of the invention, there is provided a method of detecting a movement of a timepiece setting stem as recited in claim 1.

The proposed new solution has the advantage that relative movements can be detected very precisely. For instance, a relative angular position detection resolution of about 9600 positions per full rotation of the crown may be achieved with the present solution, which is by far more than what can be currently achieved with other kinds of stems. Since at least some of the movements are detected optically, the wear in the system is also minimised, and hence the lifetime of the setting stem consequently improved. Furthermore, the proposed arrangement takes up little space, which is very advantageous in watches, where the available space is limited.

According to a second aspect of the invention, there is provided a sensor arrangement as recited in claim 14.

According to a third aspect of the invention, there is provided a timepiece comprising the sensor arrangement.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF AN EMBODIMENT OF THE INVENTION

Figure 1:
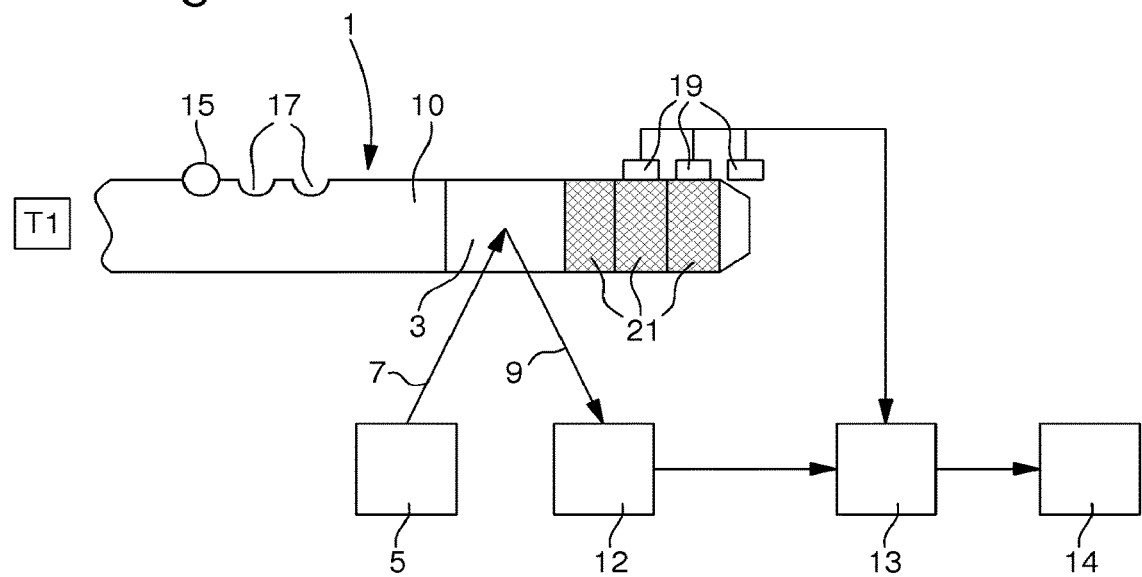
FIG. 1 is a block diagram showing an arrangement to determine the axial position and measure rotational movements of a setting stem shaft according to a preferred embodiment of the present invention.

An embodiment of the present invention will now be described in detail, with reference to the attached figures. Identical or corresponding functional and structural elements which appear in the different drawings are assigned the same reference numerals.

Figure 2:
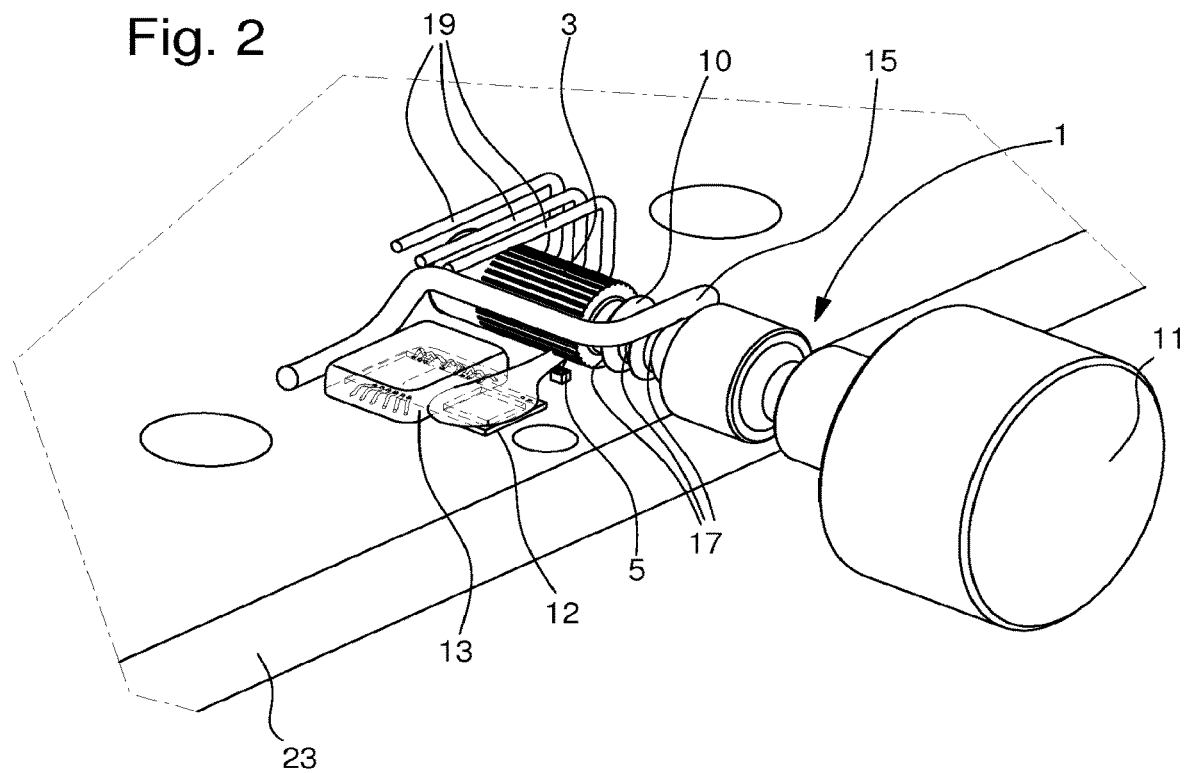
FIG. 2 is a perspective view showing an actual structure for a sensor arrangement, and a setting stem according to a preferred embodiment for the present invention.

FIG. 1 shows in a simplified manner a block diagram of the arrangement that is used to detect a position of a rotational device, such as a setting stem 1 of an electronic watch. FIG. 2 shows a perspective view of a structure that can be applied for such a functional arrangement. Illustrated in FIGS. 1 and 2 is the shaft 10 of the setting stem. When applied to a wristwatch, the diameter of the shaft is typically in the range of 0.5 to 2 mm. One end of this shaft 10, in this example the left end, may have for instance a crown or knob that a user can use to push, pull or rotate the shaft 10. The shaft 10 has on its surface a reflection area 3. This reflection area may simply be a non-perfect shaft surface having imperfections, such as spots of slightly different colours or surface shape imperfections. The reflection area may also comprise an image or pattern. In this example the reflection area 3 extends around the whole circumference of the shaft and has a given width. This width may be between 1 mm and 1 cm for example. If the reflection area 3 comprises an image, then it is not limited to any specific type of image. Many different kinds of images could be used. Preferably, however, it contains a pattern, which does not repeat itself or does not contain patterns that are repeated, in order to avoid aliasing errors.

FIGS. 1 and 2 also show a light source 5, which is arranged to direct a light beam or light rays on to the shaft and more specifically on to the reflection area 3. The light source may be for example a light emitting diode (LED). When in operation, the light source sends an interrogating light signal 7 towards the reflection area 3. When the interrogating light beam hits the shaft surface, which is at least to a certain extent reflective, then a reflected light beam 9 is reflected back towards an optical sensor 12, also referred to as light detector, which is arranged to detect the reflected light beam 9. According to an alternate non-illustrated embodiment, the reflection area 3 may be replaced by a diffraction area, also provided with imperfections, so that the light beam is redirected on the optical sensor 12 as well. It is to be noted that different spots on the shaft, which receive the interrogating light signal 7, reflect the light to the sensor differently, especially where the imperfections are located.

Then the optical sensor 12 or a signal processing unit 13 can form an array of pixels from the reflected light beam 9, provided that the dimensions of the imperfections are large enough to cover an entire pixel in order to be materialized, which in practice is always the case. According to a preferred embodiment, the optical sensor 12 will be fitted with an array of 30*30 pixels up to 100*100 pixels. The formed array of pixels contains pixels of different intensity. Some of the pixels may be very dark, while some of the pixels may be very light. The array of pixels is then further processed by the signal processor 13 as explained hereafter.

The light source 5, when illuminated, constantly emits the interrogating signal. Instead of emitting light continuously, it is also preferably arranged to emit intermittently, for instance once every millisecond, in order to save energy. The sensor arrangement described above is arranged to extract pixel patterns from the reflected signal, i.e. the light beam 9 at given time intervals, corresponding to a frequency comprised between 100 and 10000 times per second. The signal processor 13 is arranged to compare two consecutive pixel patterns that have been formed. For the sake of simplifying the sampling process, the sampling frequency used by the signal processor 13 may be aligned to the frequency of the flashes of a LED used as light source 5, and the signal processor also controls this LED for synchronisation purposes. As a result, the sampling occurs each time the LED is turned on. In order to save processing power, it may be beneficial in every pixel pattern to concentrate on a subset of the pixels only, for instance on some of the dark pixels. By comparing these pixels from the two consecutive pixel patterns created from two consecutive reflected light beams 9, it is possible to determine the angular movement or relative angular position of the shaft 10 and also the sense of rotation of the shaft 1. In fact the optical position determination follows the same principles as the ones employed for traditional optical mice.

An incremental movement counter 14 may be implemented in the signal processor or it may be connected to the signal processor 13. A value of 1 is added to that counter every time when it is detected that the latest pixel pattern is shifted for example by one pixel in a first direction with respect to the previous pixel pattern. On the other hand a value of 1 is subtracted from the counter, if the latest pixel pattern is detected to be shifted by one pixel in a second direction, whereby the first direction is opposite to the second direction. Thus, the counter value at any given time instant represents indirectly how much the shaft has been rotated with respect to the original position of the shaft 10, when the first pixel pattern was created. A mapping can be made between the counter value and the angle of rotation of the shaft 10. The angular position detection resolution can be defined to be up to about 9600 angular positions per one full rotation (360 degrees) of the shaft 10, which is at least an order of magnitude 100 times more than the usual maximal resolution for regular setting stems arranged within current electronic watches, usually set below 100 possible discrete angular positions. Thus, the relative angular position detection arrangement operates as an incremental position detector. It is however to be noted that, instead of incrementing and/or decrementing the counter by one every time when the second pattern is shifted by one pixel, it is possible to define the increment and/or decrement to take place only when the amount of shift is any other given number.

The optical detection arrangement described above, that is intended to perform relative movement measurements only sporadically, can typically be most of the time in a sleep mode to save as much energy as possible. It can be woken up for instance by an activation signal to perform the measurements when an axial movement of the crown is detected. The axial movement can be detected by the axial movement detection arrangement as described below. Alternatively there may be a specific movement detector to detect the axial and/or angular movement of the crown 11, in charge of triggering the activation of the movement measurements. It is also possible to put the optical detection arrangement into sleep mode at a given time instant. This could be done for instance when, after a movement of the crown 11, it has detected to be immobile for a given time period.

In FIGS. 1 and 2 there is further shown an axial position latching spring 15, acting as axial movement blocking means, that is arranged to latch the shaft axially in place. For this purpose, recesses 17 are provided on the crown shaft so that one recess 17 corresponds to one discrete axial position. In an axial position where the latching spring 15 lies in one of the recesses as shown in FIGS. 1 and 2, any axial movement of the shaft 10 is blocked. The latching spring 15 may also have another purpose, namely that of setting the shaft 10 to a desired electrical potential. This property of the latching spring 15 is needed if the detection of the axial position of the rotational device is done galvanically as in the present example. If the latching spring 15 is not used for setting conductive sections of the rotational device to a desired electrical potential, then a separate additional contact would be needed to make the electrical contact to set the electrical potential.

Indeed, according to this example illustrated by FIG. 1, the axial position is detected galvanically by axial position detection means or galvanic sensors 19. In this example there are three of them. These sensors 19 are arranged to interact electronically with the shaft 10 of the setting stem 1, and they may comprise conducting brushes making mechanical and electrical contact with the surface of the crown shaft. The surface of the shaft 10 may comprise axially encoded sections 21 of different conductivity. For instance, the surface of the rotational device 1 may comprise axial conducting sections or insulating sections. Actually each section may be an encoded ring as shown in FIG. 1 defining either of these conductivities. Thus, the encoded rings may represent a binary pattern comprising a representation of logical 1s and 0s. One logical state, such as the logical bit 1, may be represented by a first conductive material, whereas another logical state, such as the logical state 0, may be represented by a second isolating material, where the first and second materials are different. The conductive rings may be made of metal, whereas the non-conductive rings may be made of plastic. Other materials, such as different paints or dyes, may also be used instead. The values detected by the galvanic sensors are sent to the signal processor 13 for determining the axial position based on the received measurement values. Thus, the galvanic sensors are arranged to detect different electrically conductive areas on the surface of the rotational device 1 and from these findings, the absolute axial position can be determined.

In the example illustrated in FIG. 1, all the encoded sections 21 are conducting sections, and when counted from the left, which is the direction where a crown would terminate the setting stem 1. The first two rings are in contact with the sensors 19, whereas the last rightmost ring is not any more in contact with any sensor 19. Since each sensor 19 is operable to generate a corresponding signal, representing the respective encoded ring, the overall logical state of the shaft in this axial position can be depicted as a "110" logical state, which preferably corresponds to the rest position of a setting stem 1, and that is usually referred to as T1. Moving the shaft 10 to the right would then correspond to a pushed position T0—not illustrated—corresponding to the logical state "111" that is unstable, i.e. releasing the pressure off a terminating crown or knob actuating the shaft 10 would immediately reset its axial positioning back to T1. In contrast, moving the shaft 10 to the left would yield the two subsequent possible so-called "pulled" positions (not illustrated either on the figures) which are stable thanks to the positioning of the latching spring 15 in the recess 17 from the middle or from the right, respectively:

T2, corresponding to a logical state "100" and
T3, corresponding to logical state "000".

In FIG. 2 the light source 5 and relatively flat optical sensor 12 are shown to be located on a flat PCB (printed circuit board) 23 stretching along in a single plane of a rectangular support. In another configuration (not illustrated), the PCB 23 could show an "L" shape so that a first part of the PCB 23 is arranged at an angle of e.g. 90 degrees to a second part of the PCB 23 in such a way that most of the circuit elements, including the light source 5, are mounted on the first part, while the optical sensor 12 are mounted on the second part. In other words, the front face of the optical sensor 12 is mounted perpendicularly to the first part of the PCB 23. This has the advantage that the reflected light pattern arriving from the shaft would reach the optical sensor at an angle close to 90 degrees with respect to the front face of the sensor. Indeed, to facilitate the creation of the pixel patterns, it is beneficial to have the angle of incidence of the reflected light signal 9 when reaching the optical sensor close to zero, preferably within less than 10 degrees with respect to this direction. The desired angle may be achieved by mounting the optical sensor 12 on to the second part of the PCB 23, which is angled as desired with respect to the first and main part of the PCB 23. Alternatively, the optical sensor 12 may be angled by other means.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For instance, it would also be possible to use the optical position detection arrangement to determine also the axial position of the shaft 10. In this case the galvanic detection arrangement as illustrated on FIGS. 1&2 would not be needed any more. However, any other adequate contactless system (capacitive, inductive, . . . ) could also be considered to this end. It is also to be noted that some elements shown in the figures as separate physical elements, could also be arranged as a single physical element. For instance, the functionalities of the light detector 12, the signal processor 13 and the counter 14 could be configured as one single element.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. A method of detecting a movement of a timepiece setting stem arranged to be moved axially along and/or rotated about its longitudinal axis, the method comprising:
   illuminating, with a light source, a portion of the longitudinal axis of the timepiece setting stem of a crown;
   receiving, with an optical sensor, a light beam reflected from the portion of the timepiece setting stem;
   forming, with a processor, a first pixel pattern representative of the light beam reflected from the timepiece setting stem at a first time instant;
   forming, with the processor, a second pixel pattern representative of the light beam reflected from the timepiece setting stem at a second time instant later than the first time instant; and
   determining that the timepiece setting stem has been moved when the second pixel pattern is shifted with respect to the first pixel pattern.

2. The method according to claim 1, wherein the detected movement is angular movement of the timepiece setting stem.

3. The method according to claim 1, further comprising determining an amount of the movement of the timepiece setting stem by determining how much the second pixel pattern is shifted with respect to the first pixel pattern.

4. The method according to claim 1, further comprising incrementing a register value by one when the second pixel pattern is shifted in a first direction by one pixel with respect to the first pixel pattern, and decrementing the register value by one when the second pixel pattern is shifted in a second direction, opposite to the first direction, by one pixel with respect to the first pixel pattern.

5. The method according to claim 4, wherein an amount of angular movement of the timepiece setting stem at any time instant is given by the register value.

6. The method according to claim 1, further comprising detecting galvanically an axial movement of the timepiece setting stem.

7. The method according to claim 6, wherein the galvanic detection comprises encoding the portion of the timepiece setting stem with an encoding pattern having varying electrical conductivity, wherein the encoded pattern is a binary pattern comprising encoded rings and contacting the encoding pattern with conducting sensor elements to determine the encoding pattern at a given axial position of the timepiece setting stem.

8. The method according to claim 1, wherein a detection resolution of more than 100 angular positions for the timepiece setting stem can be defined.

9. The method according to claim 1, wherein an angle of incidence of the light beam reflected from the timepiece setting stem reaching the optical sensor is between +10 and −10 degrees.

10. The method according to claim 1, further comprising receiving a movement detection activation signal to activate the method.

11. The method according to claim 10, wherein the movement detection activation signal is received when any type of movement of the timepiece setting stem is detected.

12. The method according to claim 1, further comprising deactivating the method when the timepiece setting stem has been detected to be immobile for a given time period.

13. The method according to claim 1, wherein the first and second pixel patterns are formed at least 100 times per second.

14. A sensor arrangement for detecting a movement of a timepiece setting stem, the arrangement comprising:
- the timepiece setting stem of a crown arranged to be moved axially and/or rotated about its longitudinal axis;
- a light source to illuminate a portion of the longitudinal axis of the timepiece setting stem;
- an optical sensor to receive a light beam reflected from the portion of the timepiece setting stem; and
- a processor configured to process the light beam reflected from the timepiece setting stem,
- wherein the processor is configured to form a pixel pattern representative of the light beam reflected from the timepiece setting stem and to compare a first pixel pattern obtained at a first time instant and a second pixel pattern obtained at a second time instant later than the first time instant, and when the second pixel pattern is shifted with respect to the first pixel pattern, then the processor is configured to determine that the timepiece setting stem has been moved.

15. A timepiece comprising the sensor arrangement according to claim 14.

16. A method of detecting a movement of a timepiece setting stem arranged to be moved axially along and/or rotated about its longitudinal axis, the method comprising:
- illuminating, with a light source, a portion of the timepiece setting stem of a crown;
- receiving, with an optical sensor, a reflected or diffracted light beam from the timepiece setting stem;
- forming, with a processor, a first pixel pattern representative of the reflected light beam at a first time instant;
- forming, with the processor, a second pixel pattern representative of the reflected light beam at a second, later time instant;
- determining that the timepiece setting stem has been moved when the second pixel pattern is shifted with respect to the first pixel pattern; and
- incrementing a register value by one when the second pixel pattern is shifted in a first direction by one pixel with respect to the first pixel pattern, and decrementing the register value by one when the second pixel pattern is shifted in a second direction, opposite to the first direction, by one pixel with respect to the first pixel pattern.

* * * * *